April 28, 1970  E. GREENSTEIN  3,508,623
ULTRASONIC TYPE NET WEIGHT LOAD INDICATOR FOR VEHICLES
Filed April 23, 1969
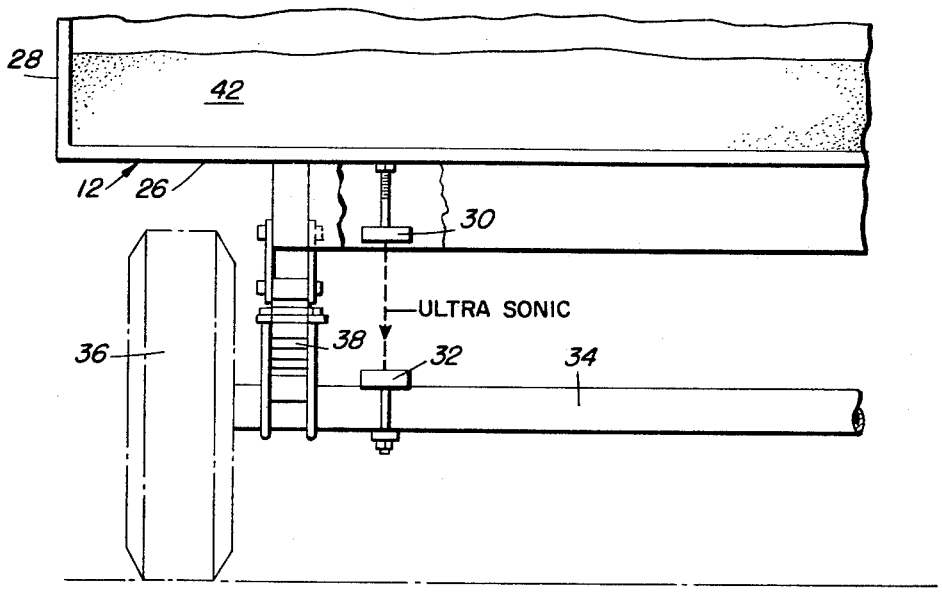
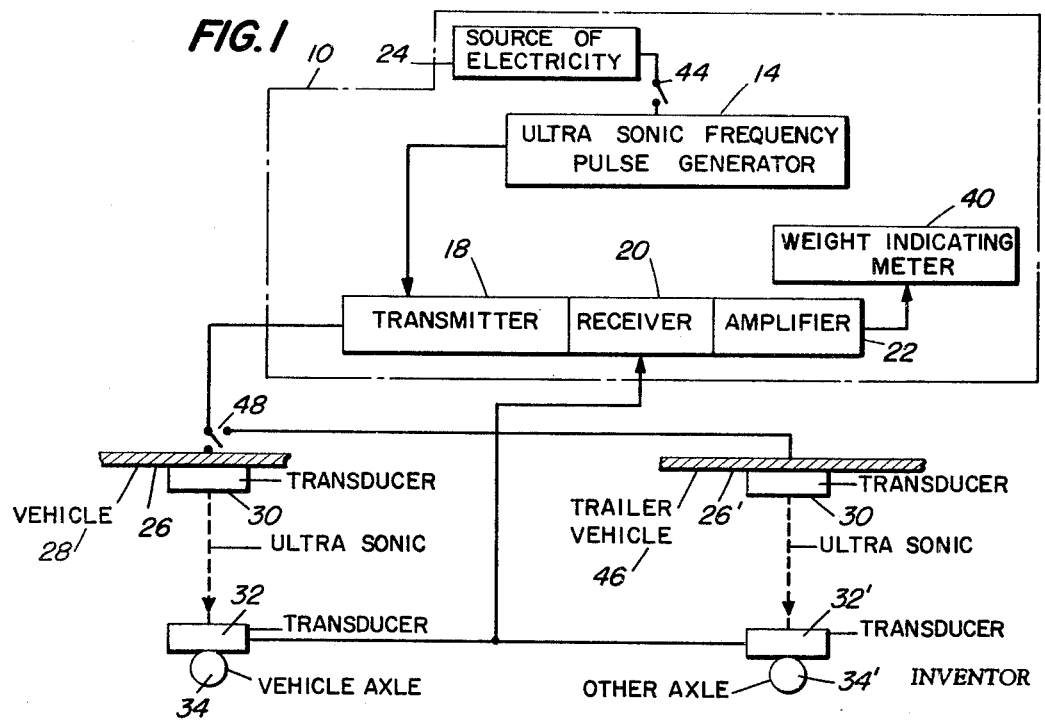
INVENTOR
Edward Greenstein
BY *Gustaves Miller*
ATTORNEY

# United States Patent Office 3,508,623
Patented Apr. 28, 1970

3,508,623
ULTRASONIC TYPE NET WEIGHT LOAD INDICATOR FOR VEHICLES
Edward Greenstein, Brooklyn, N.Y., assignor to Earl C. Nolan, Biloxi, Miss.
Filed Apr. 23, 1969, Ser. No. 818,745
Int. Cl. G01g 19/08, 19/12; B60p 5/00
U.S. Cl. 177—137       6 Claims

ABSTRACT OF THE DISCLOSURE

This invention is a weight load indicator for vehicles and measures the net weight of the load of a vehicle or the weight on each axle, on a meter weight indicator located in the cab of the vehicle. It includes an ultrasonic pulse generator which is operated, when desired, to send a burst of sound through a sonic path between a pair of transducers. One of the pair of transducers is located on the underside of the vehicle and the other of the pair of transducers is mounted on the vehicle axle, there being springs on the axle supporting the vehicle body. A transmitter is in circuit between the generator and one transducer, and a receiver is in circuit between the other transducer and a meter, calibrated in weight, and the meter is thus actuated to reflect the time it takes for the sound to travel between the transducers, which varies in proportion to the compression of the vehicle springs under the weight of the load thereon. One or more trailer vehicles, on the highway, or in a freight train, may have their loads indicated in the tractor vehicle cab by having a second pair of transducers mounted on the trailer vehicle underside and axle through a selective switch to the same ultrasonic pulse generator, and to the same meter.

OBJECTS OF THE INVENTION

This invention has for an object to provide an improved means for indicating the net weight of the load on a vehicle or the total weight on an axle, as well as on one or more trailer vehicles, if present, the weight indication taking place at any convenient location as in the cab of the tractor vehicle.

A further object of this invention is to utilize the vehicle springs as the primary measure of the weight of the load, and to measure the compression of the vehicle springs by electronically measuring the varying time it takes for an ultrasonic sound to travel between a pair of transducers, one on the vehicle underside and the other mounted on the vehicle axle, and transmitting this time element to a meter calibrated in weight and located where convenient. If desired, a pair of transducers may be provided for each axle to indicate each axle load, as well as the net weight load.

A further object of this invention is to provide a much more sensitive weight indicator than that provided in U.S. patent to Nolan 3,428,139, by using a pair of transducers in the sonic path of each other, rather than one transducer and a sonic reflector, as in this patent, and in placing one of the pair of transducers in a circuit to the receiver and thus to the weight indicator.

BACKGROUND OF THE INVENTION

One of the great problems today is to prevent the overloading of freight cars or of heavy trucks which travel on the highways. There are limits set for each freight car or for each entire truck and for each axle of a truck. This makes it imperative that the operator know during loading of his vehicle when he is approaching the maximum load limit for the entire vehicle, and the maximum load for each axle. Furthermore, in order to keep maintenance to a minimum, the operator should keep the loads in his truck evenly distributed relative to the wheels thereof.

In connection with freight cars, with trucks, aircraft and other carriers, it is important that they be properly loaded so that they will carry maximum load properly distributed but without overloading the carrier. In particular connection with trucks and such ground vehicles, practically all states have strict laws regulating total load and axle load and such states likewise having weighing stations where trucks passing through the state are required to weigh in. Severe penalties are invoked for overweight trucks and considerable delay is encountered in carrying out the weighing operations.

BRIEF DESCRIPTION OF THE FIGURES

With the above and related objects in view, this invention consists in the details of construction and combination of parts, as will be more fully understood from the following description, when read in conjunction with the accompanying drawing, in which:

FIG. 1 is a diagrammatic showing of the entire invention.

FIG. 2 is a fragmentary showing of the pair of transducers, one on the underside of a vehicle in the sonic path of the other on the axle of the vehicle.

DETAILED DESCRIPTION OF THE INVENTION

There is shown at 10, diagrammatically, the cab or other convenient location of a vehicle 12 to which this invention has been applied. In or adjacent the cab or location 10, there is located an ultrasonic frequency pulse generator 14.

The ultrasonic frequency pulse from generator 14 is picked up by a transmitter 18, receiver 20 and amplifier 22, all in circuit with any convenient source of electricity, which may be a battery 24 which, for convenience, may be the battery of the vehicle 12. Mounted on the underside or bottom 26 of the load body 28 of the vehicle 12 is one, 30, of a pair of transducers 30, 32. The other transducer, 32, of the pair is mounted on a vehicle axle 34 on which the vehicle wheel 36 is journaled, and the axle 34 is provided with the spring 38 supporting the body 28, the spring compressing in proportion to the load 42 placed on the body 28 between a minimum unloaded position shown in FIG. 3 to a maximum loaded position shown in FIG. 4, thus varying the distance between the one transducer 30 and the other transducer 32 in proportion to the weight of the load 42. The pair of transducers 30 and 32 are in the sonic path of each other.

The transducer 32 is in circuit through the receiver 20 (and amplifier 22) to meter 40 calibrated to indicate weight and located in the cab 10, a switch 44 being suitably located in the circuit within the cab 10.

OPERATION OF INVENTION

In operation, if the invention is used only for informing the operator of the net weight of the load, the meter 40 is calibrated to indicate no weight when the vehicle is empty to the maximum weight when the vehicle 12 is fully loaded. When this information is desired, as while the vehicle 12 is being loaded, the driver, from time to time, closes the switch 44, sending a burst of ultrasonic frequency pulse, possibly of the nature of 15,000 per minute, from the generator 14 through the circuit of the transmitter 18 to the transducer 30, and the ultrasonic sound travels from the one transducer 30 to the other transducer 32, the time for such traveling varying according to the variation in the distance between the body bottom 26 and the axle 34 as determined by the compression of the spring 38, thus being in proportion to the net weight of the load 42. From the receiver 20, the circuit goes to the weight indicating meter 40. The driver thus can read his net weight immediately. If the vehicle 12 has a trailer vehicle 46 attached thereto, such trailer 46 has one, 30', of a second pair of transducers 30' and 32' on its bottom 26', with the other, 32', in its sonic path mounted on the trailer axle 34' and a switch 48 is provided to switch the circuit from the first pair of transducers 30 and 32 of the tractor vehicle 12 to the second pair of transducers 30' and 32' on the trailer vehicle 46.

Potentiometers are provided in the circuit to calibrate the scale of the meter 40 to fit each different loading situation normally encountered. Sensitivity of the meter 40 is greatly increased by the use of the pair of transducers 30 and 32. It may be increased further by adjusting the amplification 22 to the receiver 20. In addition, this invention may be used for the total weight on each axle 34, not only of the tractor vehicle 12, but also of the trailer vehicle or vehicles 46, by providing a pair of transducers for each axle 34 and 34' of each vehicle 12 and 46, and a meter 40 or meters 40 suitably calibrated, to indicate the total load on each axle 34 and 34', thus enabling the driver to keep the weight of the axle load, during loading, within the legal or safe limit permitted for each axle 34 and 34'.

ABSTRACT OF THE DRAWING

In the drawings, like numbers refer to like parts, and for the purposes of explication, marshalled below are the numbered parts of the improved net weight load indicator for vehicles:

- 10 cab of 12
- 12 vehicle or freight car
- 14 ultrasonic frequency pulse generator
- 18 transmitter
- 20 receiver
- 22 amplifier
- 24 battery
- 26 underside or bottom of 28
- 26' underside or bottom of trailer
- 28 vehicle body
- 30 one transducer of pair 30 and 32
- 30' one of second pair 30' and 32'
- 32 other transducer of first pair 30 and 32
- 32' other transducer on 34' of second pair 30' and 32'
- 34 axle
- 34' second axle
- 36 wheel
- 38 spring of 12
- 40 meter calibrated in weight
- 42 load
- 44 switch in circuit to meter 40
- 46 trailer vehicle
- 48 switch to select circuit to either transducer 30 or 30'

Although this invention has been described in considerable detail, such description is intended as being illustrative rather than limiting, since the invention may be variously embodied.

Having thus set forth and disclosed the nature of this invention, what is claimed is:

1. In connection with a container means (12) adapted to contain a load (42), the container means (12) having a body means (28), springs (38) for supporting said body means (28) on said base means (34); the improvement comprising a pulse generator (14) of ultrasonic frequencies, an ultrasonic frequency pulse transmitter (18) connected thereto, a pair of transducers (30 and 32), one transducer (30) being mounted on the container body means (28), the other transducer (32) being mounted on said base means (34), said transducers (30 and 32) being located in the sonic path of each other, said transmitter (18) connected in circuit between said frequency pulse generator (14) and one of said transducers (30 or 32), a weight indicating meter (40), a receiver (20) connected in circuit between said meter (40) and the other of said transducers (32 or 30), and circuit providing means (24) connected thereto.

2. The combination of claim 1, and a second pair of transducers (30' and 32'), one (30') of the second pair being mounted on said body means (28), the other (32') of the second pair being mounted on another part (34') of said base means (34 and 34'), said second pair of transducers (30' and 32') being located in the sonic path of each other, one (30' or 32') of said second pair of transducers (30' or 32') being in circuit with said transmitter (18), the other (32') of said second pair of transducers (32' or 30') being in circuit with said meter (14).

3. The combination of claim 2, and a switch (48) for selectively connecting said second pair of transducers (30' and 32') instead of said first pair of transducers (30 and 32) in circuit to indicate the weight of the other part (34') of said base means (34 and 34').

4. The combination of claim 1, said container means (12) comprising a vehicle (12), said base means comprising a vehicle axle (34) on which wheels (36) are journaled.

5. The combination of claim 2, said container means comprising a plurality of vehicles (12 and 46) connected into a freight or trailer train, one pair of transducers (30 and 32) being on one of said vehicles (12 or 46), the other pair of transducers (30' and 32') being on another of said vehicles (46 or 12).

6. The combination of claim 5, and a switch (48) for selectively connecting the pair of transducers (30 and 32 or 30' and 32') of either vehicle (12 or 46) to said meter (40) to indicate the weight of the load (42) in the selected vehicle (12 or 46).

References Cited

UNITED STATES PATENTS

| | | | |
|---|---|---|---|
| 2,923,540 | 2/1960 | Yost et al. | 177—137 |
| 2,933,302 | 4/1960 | Cordell | 177—137 |
| 2,943,296 | 6/1960 | Fryklund | 340—1 |

ROBERT S. WARD, Jr., Primary Examiner

U.S. Cl. X.R.

177—210; 340—1